(No Model.)
G. CASTLE & G. D. POHL.
CURD MILL.
No. 277,228. Patented May 8, 1883.
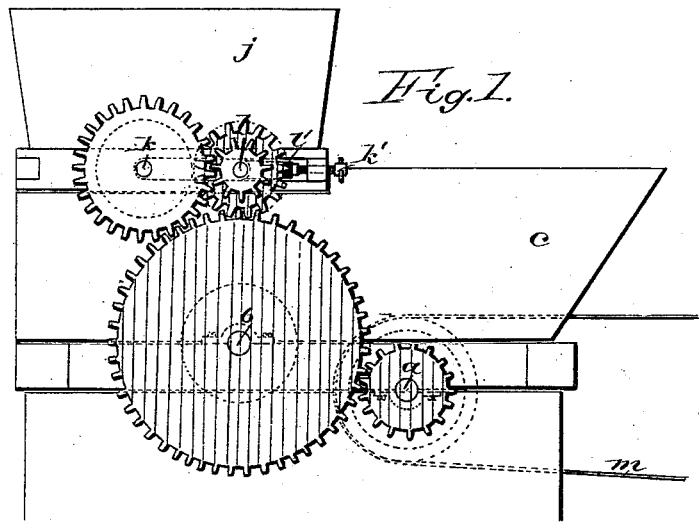
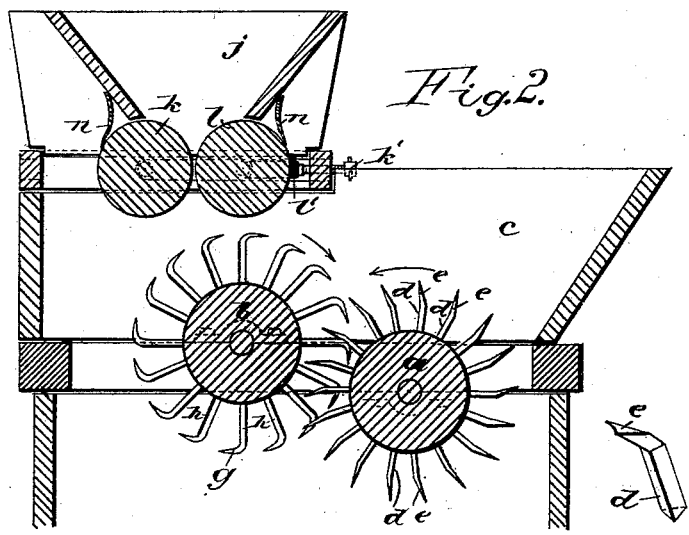
Fig. 5.
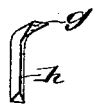
Fig. 4.
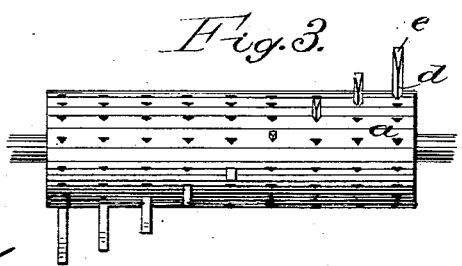
WITNESSES:
INVENTOR:
G. Castle
G. D. Pohl
BY
ATTORNEYS.

UNITED STATES PATENT OFFICE.

GOSWIN CASTLE AND GEORGE D. POHL, OF AVA, NEW YORK.

CURD-MILL.

SPECIFICATION forming part of Letters Patent No. 277,228, dated May 8, 1883.

Application filed December 6, 1882. (No model.)

*To all whom it may concern:*

Be it known that we, GOSWIN CASTLE and GEORGE D. POHL, both of Ava, in the county of Oneida and State of New York, have invented a new and Improved Curd-Mill, of which the following is a full, clear, and exact description.

Our invention consists of an improved contrivance of apparatus for grinding curd in cheese-factories before it is taken out of the vat and preparatory to putting it in the hoops, the said mill consisting, essentially, of a pair of toothed rollers working together, the said teeth being contrived for tearing or breaking up the curd rather than cutting or squeezing it, and for doing the same to better advantage than as heretofore arranged, together with a salting attachment for salting the curd while grinding it, all being contrived so that it may be worked by one person, as hereinafter fully described.

Reference is to be had to the accompanying drawings, forming part of this specification, in which similar letters of reference indicate corresponding parts in all the figures.

Figure 1 is a side elevation of our improved mill. Fig. 2 is a longitudinal section of Fig. 1. Fig. 3 is a side elevation of one of the toothed rollers. Fig. 4 is a perspective view of one of the hook-shaped teeth used on one of the rollers, and Fig. 5 is a perspective view of one of the teeth of the other roller.

We arrange a pair of cylinders or rollers, $a$ $b$, in any approved part of the vat, where the curd may be supplied to them through the hopper $c$ in any approved way, placing roller $a$ a little lower than $b$ to mainly receive the curd from the hopper, and arming it with teeth having angular front edges, $d$, and points $e$, slightly bent or inclined forward. The other roller is armed with teeth having forwardly-bent hook-points $g$ and front angular edges, $h$. The roller $a$ is geared to run about six times faster than roller $b$, whereby it will be seen that by the edges of its teeth which mesh with and pass between the teeth of roller $b$ the curd will be torn asunder against the points $g$ and between the edges $h$ to great advantage, the said edges serving to tear the curd freely and enable the rollers to work much easier than if said edges were flat.

There is an especial advantage due to the tearing of the curd, instead of cutting it, in that it presses much better in the hoops, while, as compared with the crushing process of some mills, the tearing process enables the mill to run with much less power. It is also important to have roller $a$ speeded faster than $b$, in that the curd is thereby more thoroughly torn between the teeth of roller $b$, and not crushed, as it would be if the rollers were moving at the same speed. Another advantage of this mill is that the curd can be fed into it in pieces of any size without clogging it. The curd, being fed into the hopper, is caught by the hooks of roller $b$, partly torn by the teeth of roller $a$, and as the curd is carried between the rollers by their movements it is thoroughly broken and torn by the teeth of roller $a$ passing through the curd and between the teeth of roller $b$.

Together with the said tearing-mill we propose to apply a salting attachment consisting of the hopper $j$ and a couple of crushing-rollers, $k$ $l$, mounted over or partly over the same, in which to grind and deliver the salt to the curd at the same time that it is being treated in the mill, said rollers being geared with the curd-tearing rollers to apply the power to them, and one of said rollers being adjustable toward and from each other by screws $k'$, and also being geared to run faster for regulating the quantity and fineness of the salt delivered to the curd. The screws $k'$ are made to act on said roller by means of springs $l'$, to permit the roller to yield and act with uniform pressure upon the irregular resistance of the salt passing between the two rollers.

The power may be applied by a belt, $m$, or by a hand-crank. The latter will generally be employed, as the machine will run light in consequence of the form of the teeth and the low speed of the rollers $b$.

The screws $k'$ may be adjusted to vary the distance between the rollers, and thus regulate the quantity of salt delivered.

The rollers $k$ $l$ are provided with scrapers $n$ to keep them clean.

Having thus described our invention, what we claim as new, and desire to secure by Letters Patent, is—

1. The combination, in a curd-mill, of roller $a$, having teeth $d$, with forwardly-inclined points $e$, and roller $b$, having teeth with forwardly-bent hook-points $g$ and front angular edges, $h$, substantially as described.

2. The combination, in a curd-mill, of roller $a$, having teeth $d$, with forwardly-inclined points $e$, and roller $b$, having teeth with hook-points $g$ and front angular edges, $h$, said roller $a$ being arranged lower in the hopper $c$ than the roller $b$ and geared to run faster than said roller $b$, substantially as described.

3. The combination, in a curd-mill, of toothed tearing-rollers $a\ b$ and a salting attachment consisting of grinding-rollers $k\ l$ and a hopper, $j$, substantially as described.

4. The combination, with the rollers $a\ b$ of a curd-mill, of a salting attachment consisting of the rollers $k\ l$, the roller $l$ being made adjustable and geared to run faster than the roller $k$, and a hopper, $j$, substantially as described.

GOSWIN CASTLE.
GEORGE D. POHL.

Witnesses:
SILAS C. MORSE,
G. H. ENEAR.